June 7, 1955  C. A. HALLAM ET AL  2,710,394
SEAM ERROR DETECTOR
Filed Dec. 8, 1953  2 Sheets-Sheet 1

INVENTORS
C. A. HALLAM
E. W. REYNOLDS

BY *Ive Parnell*
ATTORNEY

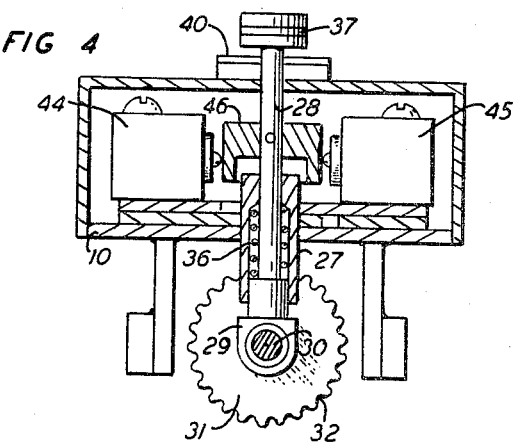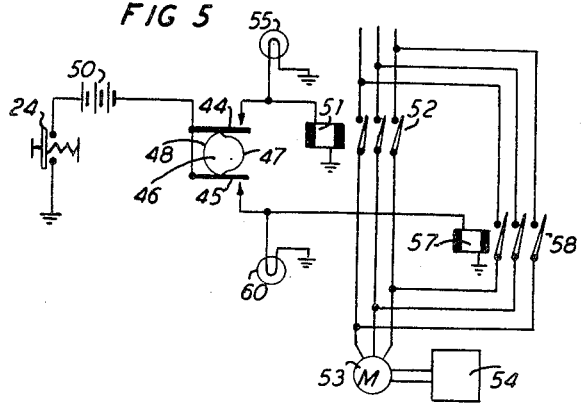

United States Patent Office 2,710,394
Patented June 7, 1955

2,710,394
SEAM ERROR DETECTOR

Cecil A. Hallam, Westfield, and Ellwood W. Reynolds, Watchung, N. J., assignors to Western Electric Company, Incorporated, New York, N. Y., a corporation of New York Application December 8, 1953, Serial No. 396,867

6 Claims. (Cl. 340—259)

This invention relates to sensing devices and more particularly to sensing devices, for use on tubular structures being formed with longitudinal seams, to detect any twist in the tube while it is advancing in a given path.

During the manufacture of tubes with abutting or overlapping longitudinal edges to form seams which are to be soldered or welded, it is important that the tubes be held against twisting during their advancement longitudinally relative to the soldering or welding units.

In the manufacture of tubular sheaths for cable cores from strips of metal having laterally extending corrugations, the longitudinal edges of which are to be overlapped to form a longitudinal seam, it is more important that the tubular sheaths be held against twisting. In tubes or sheaths of this type the corrugated overlapping edges will remain matched and in interfitting engagement with each other only as long as the seam remains in a straight line parallel with the axis of the tube. Even a very slight deviation of the seam in either direction from the straight line will result in mismatching of the corrugated overlapping edges of the seam, preventing the production of a most efficient soldering or welding of the overlapping edges. The degree of mismatch may be sufficient to seriously impair the quality of the seam and yet be difficult to detect by direct inspection of the sheath while it is in motion.

The object of the invention is a sensing device which is simple in structure and highly efficient in indicating deviations of a seam in a tube from a straight line parallel with the axis of the tube.

With this and other objects in view, the invention comprises an element rockably supported for engagement with a tube formed with a longitudinal seam while the tube is advanced longitudinally in a given path, the rocking element being adapted to rock in whichever direction the seam deviates from a straight line parallel with the axis of the tube.

In the present embodiment of the invention, an arm-like member is pivotally supported on a frame and movable into and out of engagement with longitudinally advancing tubes. A switch controlled by a cam is operated into closed position when the rocking element engages the tube. The rocking element includes spaced wheels with spaced teeth-like members on their peripheries of contours adapted for interengagement with the hills and valleys of the tube on each side of the seam so that mismatching of the corrugations resulting from a twist in the seam will rock the element to actuate indicating means.

Other objects and advantages will be apparent from the following detailed description when considered in conjunction with the accompanying drawings, wherein:

Fig. 4 is a vertical sectional view of the sensing device adjacent the rocking element and Fig. 5 is a wiring diagram illustrating one of the indicating means of the sensing device.

Figure 1:
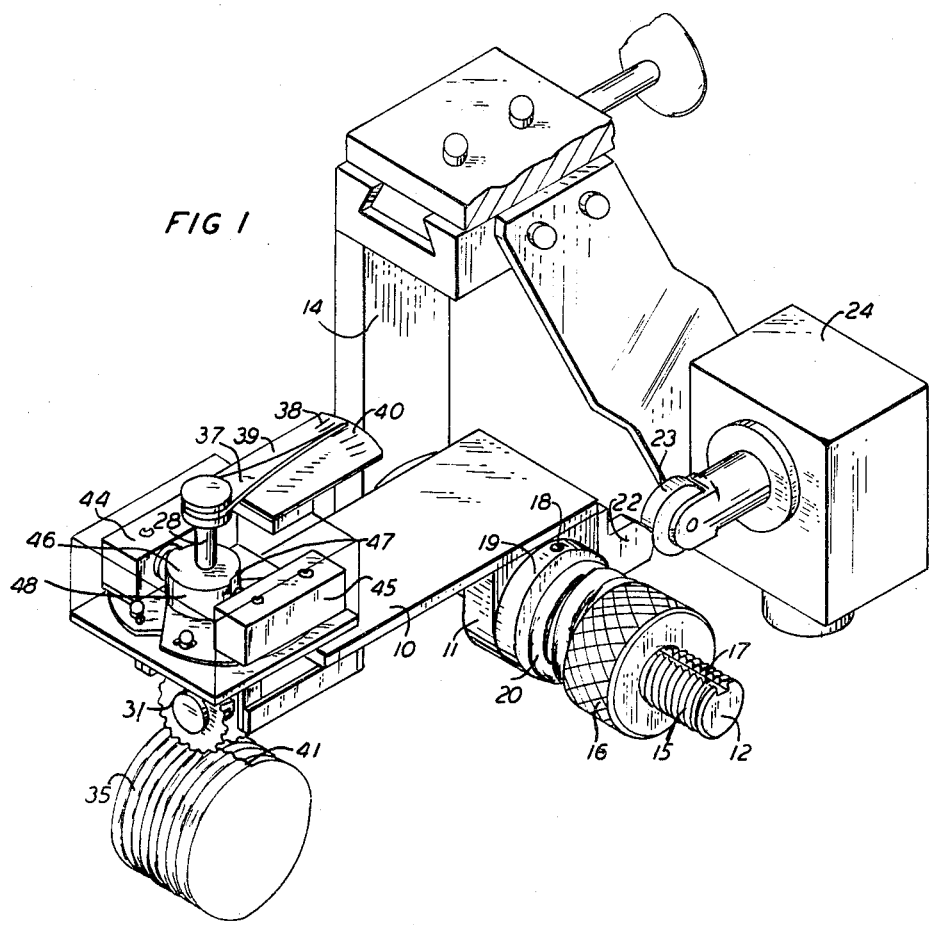
Fig. 1 is an isometric view of the sensing device shown in operative engagement with a tube whose seam is in a straight line parallel with the axis of the tube.
Figure 2:
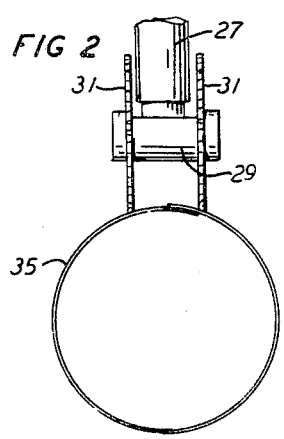
Fig. 2 is a fragmentary detailed view illustrating the wheels of the sensing device engaging the tube adjacent the longitudinal edges thereof.

The sensing device includes an arm or body 10 adapted at one end with one or more downwardly projecting bearing members 11 for pivotal mounting on a spindle 12, one end of which is carried by a fixed position frame 14. The spindle 12 is provided with threads 15 on the outer portion thereof to receive a nut 16. A longitudinally extending key-way 17 is formed in the spindle 12 for a given distance from the outer end, as shown in Fig. 1, to receive a pin 18 of a collar 19. A spring 20 disposed concentric with the spindle 12 is interposed between the collar 19 and the nut 16 to apply a variable force to the collar and through the collar to the bearing portion 11 of the arm depending on the position of the nut 16 relative to the collar. In this manner, the holding force for the arm may be varied as desired.

A cam 22 mounted on the back portion of the arm 10, or the adjacent bearing member 11 thereof, is adapted to engage a roller 23 of a normally open switch 24 to move the switch into closed position when the arm is in the operating or sensing position (shown in Fig. 1).

The forward or free end of the arm 10 is provided with a hollow bearing member 27 (Fig. 4) mounted in an aperture of the arm and rotatably supporting a rocking element 28. The part defined as a rocking element 28 may be considered merely a spindle while the term "rocking element" may include in addition to the spindle, a bearing member 29 fixed to the lower end of the spindle, a shaft 30 rotatably supported thereby and wheels 31 fixedly mounted on the ends of the shaft. The wheels 31 in the present embodiment of the invention are provided with teeth-like projections 32 conforming to the corrugations of the tube 35. The spindle 28 is free to move vertically while the wheels 32 are rotated during longitudinal advancement of the tube 35 in a given path, a spring 36 serving to normally urge the wheels into engagement with the corrugated tube and to provide a cushioning means for the rocking element.

A pointer 37 mounted on the upper end of the spindle 28 is positioned with respect to indications 38 on a fixed dial-like member 39, the indications having a central line 40 representing the normal or straight line position of the seam 41 of the tube and the indications on each side thereof representing the degrees of deviation of the seam from the straight line.

The pointer and dial-like indications 38—40 represent one indicating means of the sensing device. Another indicating means is shown schematically in Fig. 5 and includes switches 44 and 45 mounted on the arm 10 upon each side of the rocking element and under the control of a cam 46 which is mounted on and rockable with the spindle 28 of the rocking element. The cam 46 is provided with a low portion 47 and a high portion 48. The low portion 47 is adjacent the plungers of both switches 44 and 45 when the wheels 31 of the rocking element travel relative to a straight seam whereby the switches 44 and 45 will remain open. The high portion 48 of the cam is adapted to operate either one of the switches 44 or 45, as soon as the seam of the tube deviates from the straight line depending upon the direction of deviation as to which switch will be operated into closed position.

Referring now to Fig. 5, it will be noted that switch 24, closed while the sensing device is in the operating position, will condition a source of electrical energy so that rocking movement of the cam 46 in either direction will operate switch 44 or 45. Switch 44, when closed, will complete a circuit from ground battery 50 through switch 44 and winding of relay 51 to ground. Energization of the relay 51 will close normally open contacts 52 of relay 51, completing a circuit to a motor 53 causing it to drive a unit 54 in one direction. While switch 44 is closed, a circuit is also completed through an indicating means such as a lamp 55. If the cam 48 is rocked in a direction to close switch 45, a circuit will be completed through a relay winding 57 to operate normally open contacts 58 to complete a reversing circuit through the motor 53 to drive the unit 54 in the opposite direction. Closing of switch 45 also completes a circuit through an indicating means such as a lamp 60.

Figure 3:
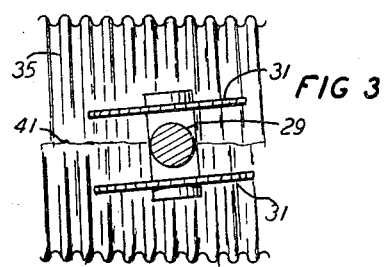
Fig. 3 is a top plan view of the structure shown in Fig. 2 illustrating the effect of mismatched edges of the tube on the wheels of the rocking element.

Considering now the operation of the sensing device, let it be assumed that the corrugated tube 35, which in the present embodiment of the invention may be a sheath on a cable, is advanced longitudinally in such a manner that the overlapping edges of the tube will remain in a straight line parallel with the axis of the tube or cable core. As long as this condition exists, the pointer 37 will remain in registration with the central indication 40 on the dial member 39 and the cam 46 will be free of the plungers of the switches 44 and 45. However, if a twist should occur in the tube in the direction illustrated in Fig. 3, the wheels 31 will be caused to follow the mismatching of the corrugated edges thereby rocking the spindle 28 to move the pointer 37 relative to the dial 39 and rock the cam 46 to operate the switch 45. Therefore, in the present embodiment of the invention, two indicating means are operated, both indicating immediately that there is a twist in the tube and also the direction of this twist and the degree of deviation from the straight line. Suitable means may be provided for removing the twist from the tube to return the seam to its straight line and allow the corrugated edges to drop into matched interengagement with each other. When this occurs, the pointer will again register with the central indication 40 and the cam 46 will again move into position where the switches 44 and 45 will be open and their various indicating means held de-energized.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A sensing device for a tube formed with a longitudinal seam of overlapping edges and advanced longitudinally in a given path, the sensing device comprising a body disposed adjacent the path, an element rockably supported by the body and adapted to engage the tube adjacent the seam to rock in either direction the seam deviates from a straight line parallel with the axis of the tube, and means responsive to the element to indicate the direction of the seam.

2. A sensing device for a tube formed with a longitudinal seam of overlapping edges and advanced longitudinally in a given path, the sensing device comprising a body disposed adjacent the path, an element rockably supported by the body and adapted to engage the tube adjacent the seam to rock in either direction the seam deviates from a straight line parallel with the axis of the tube, and means responsive to the element to indicate the direction and degree of deviation of the seam from the straight line.

3. A sensing device for a tube formed with a longitudinal seam of overlapping edges and advanced longitudinally in a given path, the sensing device comprising a body disposed adjacent the path, an element rockably supported by the body and adapted to engage the tube adjacent the seam to rock in either direction the seam deviates from a straight line parallel with the axis of the tube, means responsive to the element to indicate the direction of deviation of the seam, a support for the body, and means pivotally connecting the body to the support adapting the body for movement of the element into and out of engagement with the tube.

4. A sensing device for a longitudinally advancing tube having circumferential corrugations and a longitudinal seam with overlapping corrugated edges which remain matched while the seam travels in a line parallel with the axis of the tube, the sensing device comprising a body disposed adjacent the path of the tube, an element rockably carried by the body, and wheels, fixed to a common shaft rotatably carried by the element, to engage the tube adjacent the corrugated edges and responsive to deviations of the seam from said line in either direction to rock the element.

5. A sensing device for a longitudinally advancing tube having circumferential corrugations and a longitudinal seam with overlapping corrugated edges which remain matched while the seam travels in a line parallel with the axis of the tube, the sensing device comprising a body disposed adjacent the path of the tube, an element rockably carried by the body, wheels, fixed to a common shaft rotatably carried by the element, to engage the tube adjacent the corrugated edges and responsive to deviations of the seam from said line in either direction to rock the element, and means actuated by the rocking movement of the element to actuate means to indicate the deviations of the seam of the tube.

6. A sensing device for a longitudinally advancing tube having circumferential corrugations and a longitudinal seam with overlapping corrugated edges which remain matched while the seam travels in a line parallel with the axis of the tube, the sensing device comprising a body disposed adjacent the path of the tube, an element rockably carried by the body, wheels, fixed to a common shaft rotatably carried by the element, to engage the tube adjacent the corrugated edges and responsive to deviations of the seam from said line in either direction to rock the element, and means actuated by the rocking movement of the element to indicate the direction and degree of deviation of the seam.

References Cited in the file of this patent

UNITED STATES PATENTS

| 1,482,106 | Avery et al. | Jan. 29, 1924 |
| 1,897,472 | French | Feb. 14, 1933 |
| 2,640,893 | Stalzer | June 2, 1953 |